(12) United States Patent
Bernard et al.

(10) Patent No.: US 9,182,514 B2
(45) Date of Patent: Nov. 10, 2015

(54) SHIELDED DOUBLE-COIL MULTILAYER ASSEMBLY FOR INDUCTIVE DETECTOR

(75) Inventors: Jacques Bernard, L'Isle d'Espagnac (FR); Pierre-Marie Charrier, Angouleme (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 622 days.

(21) Appl. No.: 13/585,247

(22) Filed: Aug. 14, 2012

(65) Prior Publication Data

US 2013/0057300 A1 Mar. 7, 2013

(30) Foreign Application Priority Data

Sep. 2, 2011 (FR) ...................................... 11 57780

(51) Int. Cl.
*G01R 27/32* (2006.01)
*G01V 3/10* (2006.01)

(52) U.S. Cl.
CPC ...................................... *G01V 3/107* (2013.01)

(58) Field of Classification Search
CPC ...................................................... G01R 27/04
USPC .................................. 324/629, 652, 654–657
See application file for complete search history.

(56) References Cited

U.S. PATENT DOCUMENTS

| | | | |
|---|---|---|---|
| 3,996,510 A | 12/1976 | Guichard | |
| 5,065,093 A | 11/1991 | Nauta et al. | |
| 6,043,644 A * | 3/2000 | de Coulon et al. | 324/207.18 |
| 6,617,845 B1 * | 9/2003 | Shafiyan-Rad et al. | . 324/207.16 |
| 6,972,658 B1 * | 12/2005 | Findley et al. | 336/200 |
| 7,501,924 B2 * | 3/2009 | Zhang | 336/200 |
| 8,279,036 B2 * | 10/2012 | Banno | 336/200 |
| 2003/0001711 A1 * | 1/2003 | Tanaka et al. | 336/200 |
| 2004/0056749 A1 | 3/2004 | Kahlmann et al. | |
| 2004/0075434 A1 * | 4/2004 | Vavrek et al. | 324/318 |
| 2009/0021248 A1 | 1/2009 | Bernard et al. | |
| 2009/0045820 A1 * | 2/2009 | Shimazawa | 324/652 |
| 2009/0085560 A1 * | 4/2009 | Rollins et al. | 324/207.26 |
| 2010/0060270 A1 * | 3/2010 | Gong et al. | 324/207.16 |
| 2011/0074535 A1 * | 3/2011 | Banno | 336/192 |
| 2013/0169399 A1 * | 7/2013 | Yoo et al. | 336/180 |

FOREIGN PATENT DOCUMENTS

| | | |
|---|---|---|
| EP | 2 017 652 A1 | 1/2009 |
| WO | WO 2011/030142 A1 | 3/2011 |

OTHER PUBLICATIONS

French Preliminary Search Report issued Apr. 4, 2012 in corresponding French Application No. 11 57780 filed on Sep. 2, 2011 (with an English Translation of Categories).

* cited by examiner

*Primary Examiner* — Patrick Assouad
*Assistant Examiner* — Lamarr Brown
(74) *Attorney, Agent, or Firm* — Oblon, McClelland, Maier & Neustadt, L.L.P.

(57) ABSTRACT

The invention relates to a shielded double-coil multilayer assembly intended to be used in an inductive detector. This multilayer assembly comprises a plurality of stacked parallel separated layers, namely:
 a layer (C1) comprising a first shielding element for a first coil,
 a layer (C2) comprising all or part of a first coil,
 a layer (C3) comprising all or part of a second coil,
 a layer (C4) comprising a first shielding element for the second coil.

9 Claims, 4 Drawing Sheets

RELATED ART

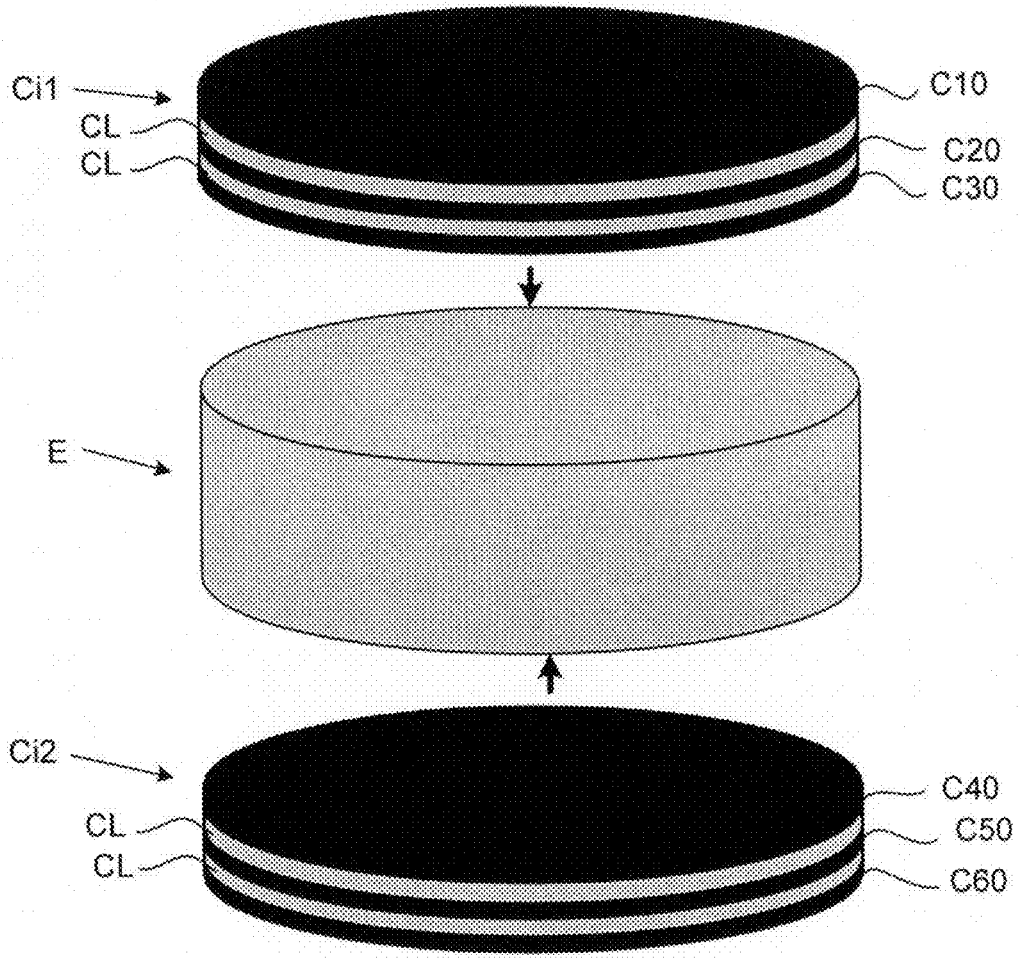

SHIELDED DOUBLE-COIL MULTILAYER ASSEMBLY FOR INDUCTIVE DETECTOR

TECHNICAL FIELD OF THE INVENTION

The present invention relates to a multilayer assembly intended to be used in an inductive detector. This multilayer assembly comprises, in particular, two separate coils.

PRIOR ART

Patent Application EP2017652A1 describes an inductive proximity detector as represented in FIG. 1. It comprises an oscillating circuit 1 of the parallel LC type excited in resonance, for example, by a current generator 2 adapted to send a current to the oscillating circuit 1, the frequency of which needs to be tuned to the resonant frequency of the oscillating circuit 1, and processing means 3 making it possible to deliver a binary output signal indicating the presence or absence of a metal target 4 in proximity to the detector. In FIG. 1, the target 4 is represented in the form of a circuit comprising a coil 40 and a resistor 41. The oscillating circuit 1 of the detector comprises two coils 10, 11 and a common capacitor 12 for the two coils, which has a determined capacitance and is connected in parallel with the two coils 10, 11. The two coils are manufactured using the same technology and, for example, are placed coaxially. A first coil is a detection coil 10 which, when it is connected to the oscillating circuit 1, is sensitive to the proximity of a metal target 4. A second coil is a reference coil 11 which has a low sensitivity to the proximity of the target 4. In other words, the reference coil 11 is arranged in order to have a mutual inductance M, with respect to the target 4 to be detected, which is substantially less than that of the detection coil with respect to the same target 4.

The two coils are manufactured using the same technology and, for example, are each produced in the form of a copper wire winding.

In the configuration of the inductive proximity detector described above, three drawbacks arise:
- the drift of the self-inductance of each coil with temperature over time,
- the drift of the relative position of the two coils and the position of the coils with respect to an optional flush mounting ring with temperature and over time,
- the drift of the range due to the variation in the stray capacitance of the two coils.

It is an object of the invention to provide a solution to the three drawbacks listed above.

This object is achieved by a multilayer assembly intended to be used in an inductive detector, characterized in that it comprises at least four stacked parallel separated layers, namely:
- a layer comprising a first shielding element for a first coil,
- a layer comprising a first coil,
- a layer comprising a second coil,
- a layer comprising a first shielding element for the second coil,
- said layers being separated from one another by connecting layers, one of said connecting layers, referred to as an intermediate connecting layer, having a determined thickness greater than those of the connecting layers separating the other layers from one another.

According to one feature, the multilayer assembly comprises an additional layer comprising a second element for shielding the first coil.

According to another feature, the multilayer assembly comprises an additional layer comprising a second element for shielding the second coil.

According to another feature, the multilayer assembly comprises an additional layer comprising a coil connected to the first coil.

According to another feature, the multilayer assembly comprises an additional layer comprising a coil connected to the second coil.

According to another feature, each coil is surrounded by an open shielding ring.

According to a first embodiment, the multilayer assembly of the invention is formed by a monobloc multilayer printed circuit.

According to a second embodiment, the multilayer assembly comprises a first multilayer printed circuit, a spacer strip forming the intermediate connecting layer and a second multilayer printed circuit, which are assembled together.

The invention also relates to an inductive proximity detector comprising a casing in which an oscillating circuit is placed which is excited in resonance by a generator and comprising a detection coil sensitive to a metal target to be detected, the oscillating circuit comprising a reference coil arranged in order to have a mutual inductance, with respect to the metal target to be detected, which is substantially less than that of the detection coil with respect to the metal target, the detector comprising processing means connected to the coils and making it possible to determine the presence or absence of the metal target in proximity to the detector, the detector comprising a multilayer assembly as defined above in its casing, the detection coil being produced in the second layer of the multilayer assembly and the reference coil being formed in the third layer of the multilayer assembly.

BRIEF DESCRIPTION OF THE FIGURES

Other features and advantages will appear in the detailed description which follows with reference to the appended drawings, in which:

FIG. 3 shows an exemplary embodiment of the multilayer assembly of the invention seen in perspective.

DETAILED DESCRIPTION OF AT LEAST ONE EMBODIMENT

Figure 1:
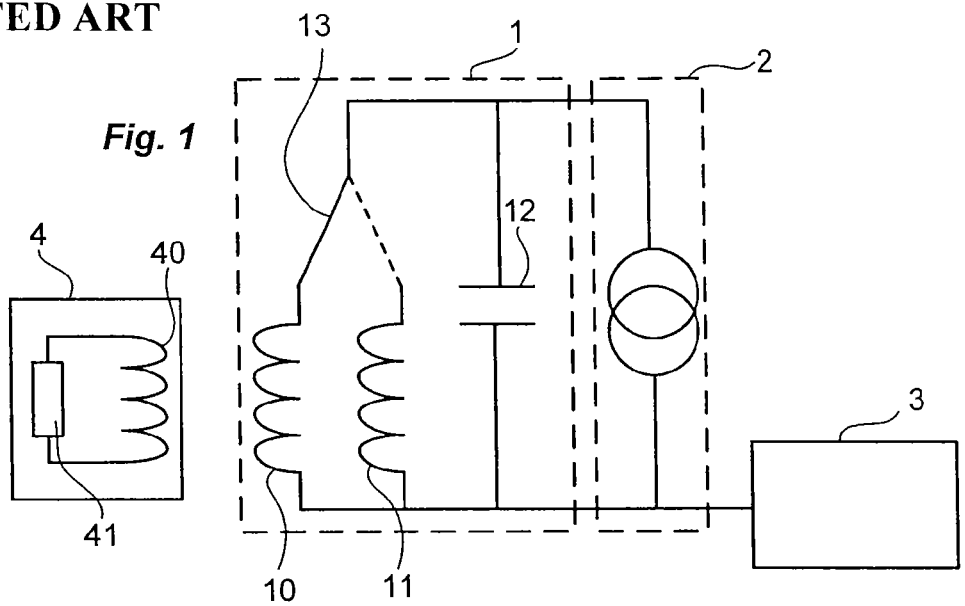
FIG. 1 represents the circuit diagram of an inductive proximity detector of the invention.

In the rest of the description and in the drawings, it should be understood that each conductive layer is separated from another by a connecting layer consisting of synthetic insulating material. This synthetic insulating material will need to be dimensionally stable with respect to temperature and over time. For example, FR4 may be used. A multilayer printed circuit will therefore comprise parallel layers on a plurality of levels, each comprising electrical tracks, each layer being separated from another by a connecting layer.

The invention relates to a multilayer assembly intended to be used in an inductive detector as described above in relation to FIG. 1.

The multilayer assembly of the invention makes it possible to overcome the aforementioned drawbacks because it makes it possible to preserve:
dimensional stability of each coil,
a stable distance between the two coils,
stability of the position of the two coils with respect to the flush mounting ring.
It furthermore makes it possible to:
reduce the capacitive sensitivity of each coil, and thus overall reduce the capacitive sensitivity of the inductive detector,
avoid any range variation of the detector associated with drifts of the relative permittivity of the surrounding materials.

According to the invention, the multilayer assembly of the invention is for example in the form of a cylinder, for example having a cross section adapted to the shape of the detector (in the figures, the cross section is circular), and it comprises at least four stacked parallel layers, that is to say two coil layers and two external layers, each comprising a shielding element.

Figure 4:
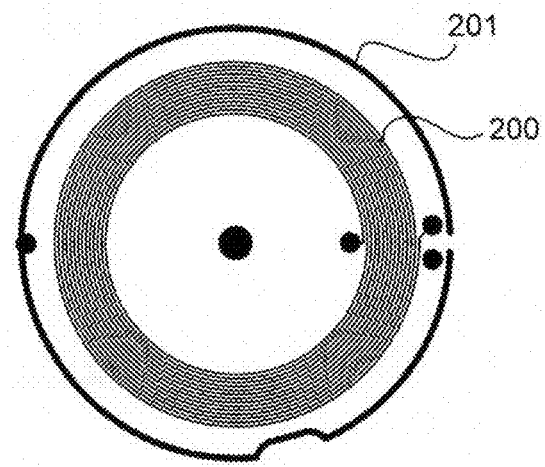
FIG. 4 represents a layer of the invention, seen in section, comprising a coil.

As represented in FIG. 4, each coil is arranged in the form of an electrical track 200 produced in the form of a spiral and from a conductive material, for example copper. It comprises two connection points, at each end of the spiral.

Advantageously, each layer provided with a coil may comprise an open shielding ring 201 surrounding the coil in order to protect it against capacitive effects on the sides. This shielding ring is represented in FIG. 4.

Figure 5:
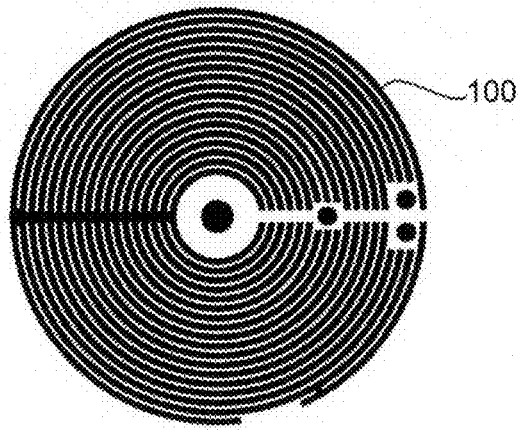
FIG. 5 represents a layer of the invention, seen in section, comprising a shielding element.

As represented in FIG. 5, each shielding element is produced for example in the form of a plurality of interrupted concentric electrical tracks 100. The surface area occupied by each shielding element in the layers in question is preferably greater than the surface area occupied by each coil in the layers in question.

Figure 2A:
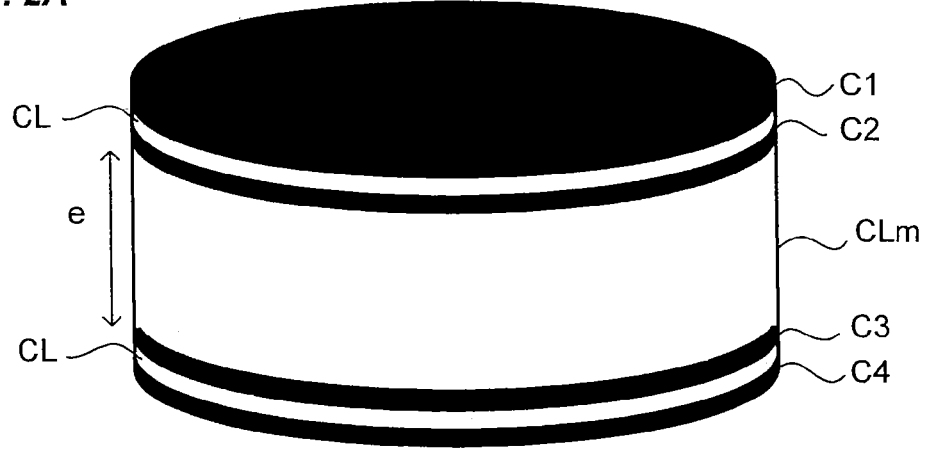
FIGS. 2A, 2B and 2C represent the multilayer assembly of the invention seen in perspective, respectively with four conductive layers, six conductive layers or eight conductive layers.

With reference to FIG. 2A, the multilayer assembly of the invention with four layers has the following structure:
a first layer C1 comprising the first element for shielding the first coil,
a second layer C2 comprising the first coil and optionally an open shielding ring around this first coil,
a third layer C3 comprising the second coil and optionally an open shielding ring around this second coil,
a fourth layer C4 comprising the second element for shielding this second coil.

As described above, each of the layers is separated from another by a connecting layer. According to the invention, the connecting layer, referred to as an intermediate connecting layer CLm, separating the second layer C2 from the third layer C3 preferably has a greater thickness (e) than the sheets separating the other layers. The thickness (e) of this intermediate connecting layer CLm thus determines the distance separating the two coils.

Figure 2B:
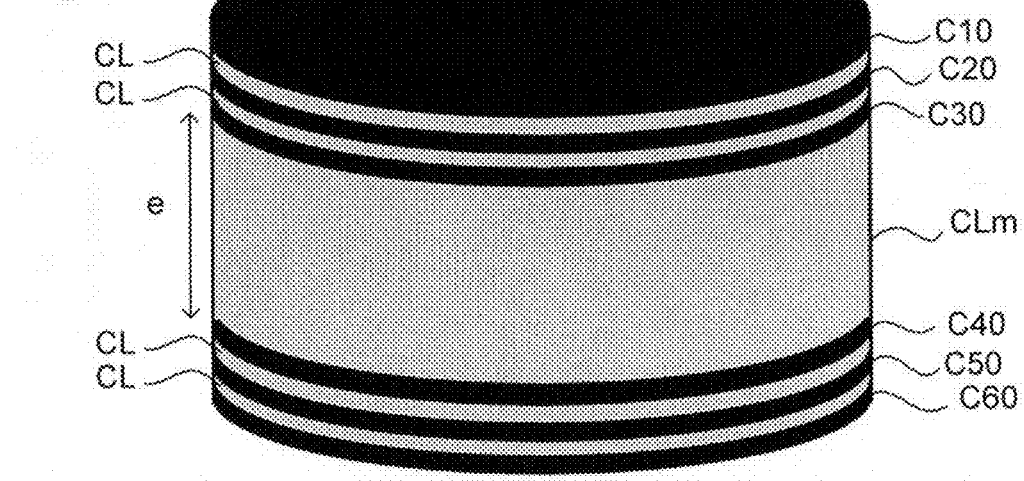

For greater effectiveness, the multilayer assembly may comprise one or two additional internal shielding layers, thus forming an assembly with five or six layers. As represented in FIG. 2B, an assembly with six layers comprises the following structure:
a first layer C10 comprising a first element for shielding the first coil,
a second layer C20 comprising the first coil and optionally an open shielding ring around this first coil,
a third layer C30 comprising a second element for shielding this first coil,
a fourth layer C40 comprising a first element for shielding the second coil,
a fifth layer C50 comprising the second coil and optionally an open shielding ring around this second coil,
a sixth layer C60 comprising a second element for shielding the second coil.

As for the embodiment with four layers, the intermediate connecting layer CLm separating the third layer C30 from the fourth layer C40 preferably has a greater thickness (e) than the sheets separating the other layers. The thickness (e) of this intermediate connecting layer CLm thus determines the distance separating the two coils.

Figure 2C:

Advantageously, each coil may also be distributed over two layers rather than just on one, thus making it possible to increase the quality factor of the coils. For each coil, the multilayer assembly of the invention may thus comprise an additional layer, i.e. at least seven or eight layers in total. As represented in FIG. 2C, an assembly with eight layers comprises the following structure:
a first layer C100 comprising a first element for shielding the first coil,
a second layer C200 comprising a first part of the first coil and optionally an open shielding ring around this first part of the first coil,
a third layer C300 comprising a second part of the first coil and optionally an open shielding ring around this second part of the first coil,
a fourth layer C400 comprising a second element for shielding the first coil,
a fifth layer C500 comprising a first element for shielding the second coil,
a sixth layer C600 comprising a first part of the second coil and optionally an open shielding ring around this first part of the second coil,
a seventh layer C700 comprising a second part of the second coil and optionally an open shielding ring around this second part of the second coil,
an eighth layer C800 comprising a second element for shielding the second coil.

As for the previous embodiments, the intermediate connecting layer CLm separating the fourth layer C400 from the fifth layer C500 preferably has a greater thickness (e) than the sheets separating the other layers. The thickness (e) of this intermediate connecting layer CLm thus determines the distance separating the two coils.

In the variants with six or eight layers, the first coil is thus protected against the capacitive effects by its first shielding element, its second shielding element and optionally its open shielding ring, and the second coil is protected against the capacitive effects by its first shielding element, its second shielding element and optionally its open shielding ring.

The multilayer assembly of the invention may be in the form of a monobloc multilayer printed circuit as represented in FIGS. 2A to 2C.

In an exemplary embodiment represented in FIG. 3, the multilayer assembly of the invention may comprise a plurality of separate elements intended to be assembled together. These elements consist of a first multilayer printed circuit Ci1 and a second multilayer printed circuit Ci2 and are intended to be assembled on either side of a spacer strip E made of a synthetic material, said spacer strip E forming the intermediate connecting layer CLm of the assembly. In FIG. 3, the assembly presented has six layers, although it should be understood that it may comprise four, eight or more thereof according to the structure adopted.

Each printed circuit thus comprises two, three or four layers (or more) according to the structure which is intended to be used. The spacer strip E and each printed circuit Ci1, Ci2 comprise, for example, complementary assembly means in order to be fixed to one another. Once assembled, the multilayer assembly is similar to that represented in one of FIGS.

2A to 2C. The thickness of the spacer strip E forming the intermediate connecting layer makes it possible to determine the distance separating the two coils.

According to the invention, the first coil is used to form the detection coil 10 of an inductive detector as described above in relation to FIG. 1. The second coil is then used to form the reference coil 11 of the inductive detector.

The multilayer assembly of the invention is intended to be accommodated directly in the casing of the detector, and each coil is subsequently connected as described above in relation to FIG. 1.

The invention claimed is:

1. A multilayer assembly usable in an inductive detector, comprising:
   at least four stacked parallel separated layers, wherein the layers include
   a first layer comprising a first shielding element for a first coil,
   a second layer comprising a first coil,
   a third layer comprising a second coil,
   a fourth layer comprising a first shielding element for the second coil, and in that said layers are separated from one another by connecting layers, one of said connecting layers, referred to as an intermediate connecting layer, having a determined thickness greater than those of the connecting layers separating the other layers from one another.

2. The multilayer assembly according to claim 1, further comprising: an additional layer comprising a second element for shielding the first coil.

3. The multilayer assembly according to claim 1, further comprising:
   an additional layer comprising a second element for shielding the second coil.

4. The multilayer assembly according to claim 1, further comprising:
   an additional layer comprising a coil connected to the first coil.

5. The multilayer assembly according to claim 1, further comprising:
   an additional layer comprising a coil connected to the second coil.

6. The multilayer assembly according to claim 1, wherein each coil is surrounded by an open shielding ring.

7. The multilayer assembly according to claim 1, wherein the multilayer assembly is formed by a monobloc multilayer printed circuit.

8. The multilayer assembly according to claim 1, further comprising:
   a first multilayer printed circuit, a spacer strip forming the intermediate connecting layer and a second multilayer printed circuit, which are assembled together.

9. An inductive proximity detector comprising:
   a casing in which an oscillating circuit is placed which is excited in resonance by a generator; and
   a detection coil sensitive to a metal target to be detected,
   wherein the oscillating circuit comprises a reference coil arranged in order to have a mutual inductance, with respect to the metal target to be detected, which is substantially less than that of the detection coil with respect to the metal target;
   processing circuitry connected to the coils and configured to determine the presence or absence of the metal target in proximity to the detector; and
   a multilayer assembly usable in an inductive detector comprising at least four stacked parallel separated layers, wherein the layers include a first layer comprising a first shielding element for a first coil, a second layer comprising a first coil, a third layer comprising a second coil, a fourth layer comprising a first shielding element for the second coil, and in that said layers are separated from one another by connecting layers, one of said connecting layers, referred to as an intermediate connecting layer, having a determined thickness greater than those of the connecting layers separating the other layers from one another,
   wherein the detection coil is produced in the second layer of the multilayer assembly and the reference coil is formed in the third layer of the multilayer assembly.

* * * * *